United States Patent [19]

Pommier

[11] 4,426,710
[45] Jan. 17, 1984

[54] PROCESSES FOR GENERATING DUO-BINARY FSK, TAMED FSK AND TFM MODULATIONS AND MODULATORS APPLYING THOSE PROCESSES

[75] Inventor: Daniel Pommier, Mordelles, France

[73] Assignees: L'Etat Francais, represente par le Secretaire d'Etat aux Postes et Telecommunications (Centre des Telecommunications); National d'Etudes and Etablissement Publie de Diffusion dit "Telediffusion de France", both of France

[21] Appl. No.: 303,128

[22] Filed: Sep. 17, 1981

[30] Foreign Application Priority Data

Sep. 24, 1980 [FR] France .............................. 80 20867

[51] Int. Cl.³ .................................................. H04L 27/12
[52] U.S. Cl. ........................................ 375/18; 375/47; 375/64; 332/23 R
[58] Field of Search ............ 375/18, 47, 48, 51, 375/64; 360/43; 332/16 R, 18, 23 R

[56] References Cited

U.S. PATENT DOCUMENTS 3,388,330 6/1968 Kretzmer .............................. 375/18
3,993,868 11/1976 Balcewicz ............................. 375/47

FOREIGN PATENT DOCUMENTS

2428345 1/1980 France .

Primary Examiner—Robert L. Griffin
Assistant Examiner—Albert W. Watkins
Attorney, Agent, or Firm—Laff, Whitesel, Conte & Saret

[57] ABSTRACT

To obtain a duo-binary FSK modulation, the modulating binary signal train has a three state partial response and is fed through a precoding, a transition-type coding, a simplified MSK modulation at the carrier frequency, a frequency division by two, and a multiplication by the same signal delayed by one binary element period. In order to obtain a "tamed FSK" modulation, the modulating binary signal train has a five state partial response and is fed through precoding, a transition-type coding, a simplified MSK modulation at the carrier frequency, a frequency division by two, a multiplication by the same signal delayed, for one part, by one binary element period and, for the other part, by two binary element periods. A TFM modulation is obtained by using the FSK duo-binary generating process, but a wave shaping filter is connected between the division by two circuit and the multiplication circuit. In a TFM modulator, the train of binary signals is applied to a partial response precoding circuit, the output of which is connected to a transition-type coding circuit, the output of which is connected to the input of a simplified MSK modulator, the output of which is connected to the input of a frequency divider by two, the output of which is connected to the input of a wave shaping filter, the output of which is directly connected to an input of a multiplier, and to the other input of the multiplier via a delay-type circuit.

7 Claims, 11 Drawing Figures

FIG.10 MODULATION IN FIG. 8

FIG.11 PHASE VARIATION AS A FUNCTION OF TIME

PROCESSES FOR GENERATING DUO-BINARY FSK, TAMED FSK AND TFM MODULATIONS AND MODULATORS APPLYING THOSE PROCESSES

The present invention relates to processes for the generating of modulation and frequency modulations with a partial response, with 3 or 5 states, with a continuous ½ phase index and possibly with continuous frequency. In the preceding definition, the index is defined as the ratio between the peak to peak deviation of the frequency and the binary rate of flow.

In a general manner, the association of partial response coding with the frequency modulation makes it possible to obtain a constant envelope wave which corresponds to a power spectrum density which decreases much more rapidly than that of a modulation by frequency displacement, with two states of the same index. The above characteristic is very important in the case of a great capacity of numerical channels, which make use of limited band transmission supports and in which there are used non-linear members.

In addition, in order to obtain a power spectrum density with a decrease which is even more rapid than that of a modulation in which only the phase continuity is ensured, it is necessary to avoid any rapid discontinuity or variation of the instantaneous frequency.

SUMMARY OF INVENTION

According to a characteristic of the present invention, a process generates a duo-binary FSK modulation, in which a partial response precoding, with three states, is applied to the train of modulating binary signals. Then, there is a coding by transition, followed by a simplified MSK modulation at the carrier frequency, a division by two of the frequency, and then a multiplication by the same signal delayed by one binary element period.

According to another characteristic, a process for the generation of a "tamed FSK" modulation applies to the train of modulating binary signals, a partial response precoding with five states, then a coding by transition, then a simplified MSK modulation at the carrier frequency, then a division by two of the frequency, then a multiplication by the same signal delayed, for one part by a binary element period and, for the other part, by two binary element periods.

According to another characteristic, a process for generating a "tamed FM" (or TFM) modulation uses the above-mentioned duo-binary generation process. There is a shaping filter, between the division by two and the multiplication circuits.

Another object of the invention provides means to execute the above-mentioned modulation generation processes.

According to another characteristic, a modulator applies the train of modulating binary signals to a partial response precoding circuit, the output of which is connected by a coding by transition circuit, the output of which is connected to the input of a simplified MSK modulator, the output of which is connected to the input of a frequency divider by two, the output of which is connected, for one part, directly to the input of a multiplier and, for the other part, to the other input of the multiplier via a delay-type circuit $T_2$, in which T is the period of the train of binary elements.

According to another characteristic, the modulator provides for a TFM modulation in which, the output of the divider by two is connected to the input of a shaping filter, the output of which is connected for one part to an input of the multiplier and for the other part to the input of the delay-type circuit.

According to another characteristic, the shaping filter has a null impulse response if $t > T$.

The above-mentioned characteristics of the invention, as well as others, will appear more clearly upon a reading of the following description of several embodiments, shown in the attached drawings, in which.

DISCUSSION OF THE PRIOR ART

A modulation which satisfies the above stated conditions is called, in the English language, a "Tamed frequency modulation", or a "TFM". In this respect, it is possible to refer to the following technical article: "Tamed Frequency Modulation, A Novel Method to Achieve Spectrum Economy in Digital Transmission", by Frank de Jager and Cornelius B. Dekker, in the American journal IEEE Transactions on Communications, Vol. COM-26, No. 5, May, 1978, pages 524 to 542. In that respect, it will also be possible to refer to British Patent No. GB 2 004 442, the inventors of which are among the authors of the above article.

The above-mentioned article, has considered two types of emitting devices which may be used to obtain a TFM modulation. In a first type of emitting device, there is used a modulator—see FIG. 14a, page 539—which comprises two loops (locking loops) that are used to stabilize the frequency deviation of the carrying frequency. One advantage of that type of emitting device is that the output signal TFM can perfectly satisfy the condition of a constant amplitude. One drawback results from the presence of the counter-reaction loops which may cause instabilities. A second type of emitting device, uses—see FIG. 15, page 540—sine and cosine tables which are recorded in addressed memories. The advantage of that system is the absence of any counter-reaction loops. Its drawback results, in practice, from the appearance of small amplitude variations, and especially from a technical limitation toward very high rates of flow. Patent GB 2 004 442, shows those two types of emitting devices.

Figure 4:
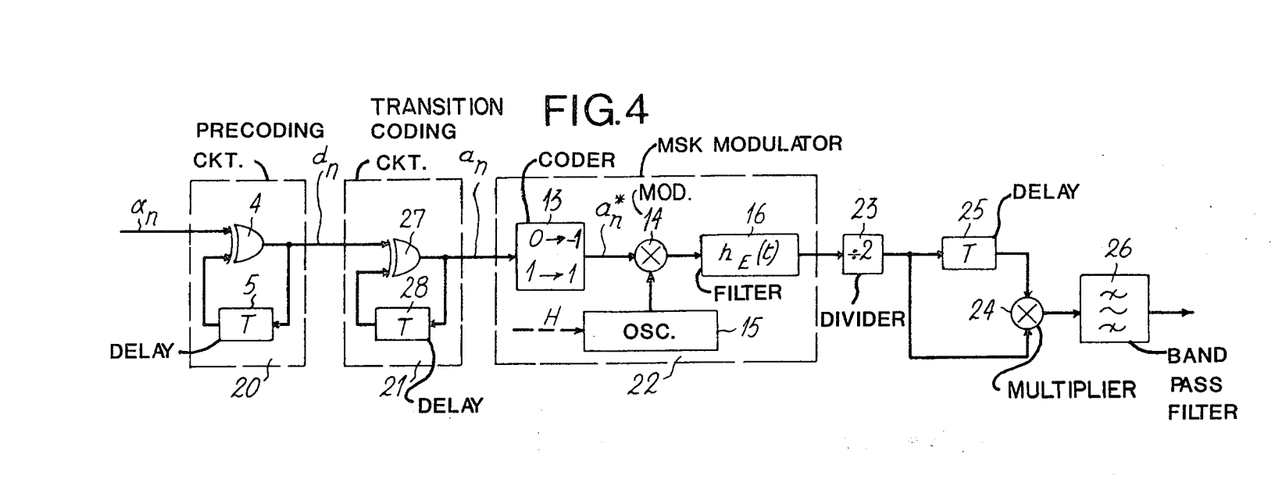
FIG. 4 is the diagram of a first FSK duo-binary modulator with three states, according to the present invention.

In addition, it will be seen according to FIGS. 4, 13 and 14 of patent GB No. 2 004 442, that there is a basic band filtering prior to modulation.

A first object of the present invention provides for a modulation process and for modulators which work according to that modulation process and which makes it possible, using tested means, to obtain a partial response of frequency modulation with 3 or 5 states and with a continuous ½ phase index.

A second object of the invention consists in providing for a modulation generating process and for partial response frequency modulators with 3 or 5 states, with a ½ phase index, and with a frequency which is continuous. That is to say, a 5 state partial response of a modulation of the TFM type, in which the above-mentioned drawbacks are avoided, comprises only a simple and stable means, such as passive filters, delay-type lines and circuits, dividers by two and ring-shaped modulators.

Before presenting the characteristics of the modulators according to the present invention, there will be reviewed a few theoretical notions which will make it possible better to appreciate the advantages of the processes and of the modulators according to the invention.

First of all there will be recalled the fact that partial response coding—refer to U.S. Pat. No. 3,388,330—consists in transforming the train of binary signals to be transmitted into a train of N states signals, having the same speed of modulation, with N being greater than 2. The redundance thus introduced creates a correlation between the emitting states. This correlation reduces the spectrum bulk of the emitted signal but, on the other hand, the increase in the number of states lowers the resistance to noise. That lowering of the resistance to noise depends on the number of states and on the modulation used. Especially, as indicated in the above-mentioned article, the use of a coherent demodulator, in the case of a 5 state TFM modulation, limits the lowering to only 1 dB relative to the performances obtained in coherent demodulation of a four phase states signal.

The partial response coding is obtained by means of two successive transforms:
  a precoding which transforms an $\alpha_1$ binary train into a $d_i$ binary train through the module 2 relationship:

$$a_n = k'_1 d_n + k'_2 d_{n-1} + \ldots + k'_{M-1} d_{n-(M-2)} \quad (1)$$

the working out of a signal with N levels corresponding to the number succession $P_1$ given by the relationship:

$$p_n = k_1 d_n + k_2 d_{n1} + \ldots + k_{M-1} d_{n-(M-2)} \quad (2)$$

in which $k_i$ are whole positive coefficients, or negative or null whole coefficients, with $k'_i = k_i$ (modulo 2) and $\alpha_n = P_n$ (modulo 2), that is to say that the information is transmitted only through the parity of $P_n$.

Especially, the 3 state partial response frequency with an index of ½ is obtained with
$k_1 = 1$, $k_2 = 1$ and $k_i = 0$; where $i > 2$
from whence:

$$d_n = (\alpha_n + d_n) \text{ modulo } 2 \quad (3)$$

$$p_n = d_n + d_{n-1}$$

$p_n$ assumes the values 0, 1, 2 which corresponds to the signal $$y_{3,n}(t) = A \cos 2\eta \left( f_o + \Delta F \left( \frac{p_n - 1}{2} \right) \right) t; t \in [nT, (n+1) T] \quad (4)$$

There is obtained a modulation with an index of ½ if: F = 1/2T, in which 1/T represents the speed of modulation.

Figure 1:
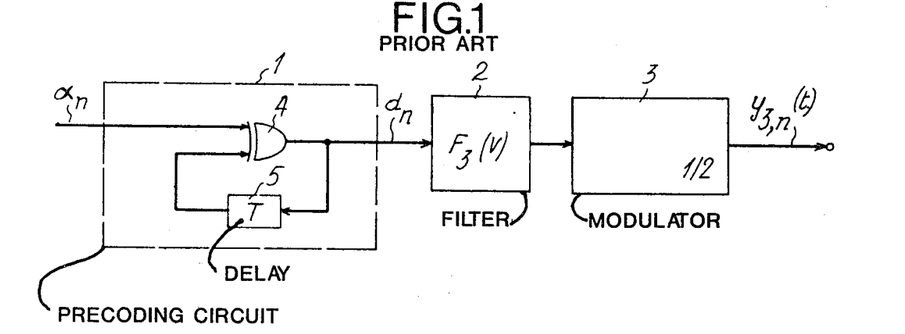
FIG. 1 is the diagram of a known FSK duo-binary modulation modulator (with three states)

The known diagram showing the principle of a partial response frequency modulator with 3 states with a ½ frequency index is shown in FIG. 1. In that diagram, the binary pure signals $\alpha_n$ are applied to a precoding circuit 1 which delivers the $d_n$ signals and the output of which is connected to the input of a filter 2, the output of which is connected to a modulator 3 which delivers the signal $y_{3,n}$. The precoding circuit 1 comprises an exclusive-OR gate 4, one input of which is connected to the input of 1 and the output of circuit which is connected, for one part to the output of circuit 1 and, for the other part, to the input of a delay-type circuit T 5, the output of which is connected to the second input of the exclusive-OR gate 4. The precoding circuit performs the addition (modulo 2) indicated above in formula (3). Filter 2 has a complex gain $F_3(\nu)$:

$$F_3(\nu) = 1 + e^{j2\pi\lambda T} \quad (5)$$

It is possible to relate that gain to the gain of filter G ($\alpha$) (shown in FIG. 4 of the afore-mentioned article, or of Patent GB No. 2 004 442). A priori, in order to operate modulator 3, it would be possible to use an analogic frequency modulator. However, that type of modulator does not make it possible to ensure, in a simple manner, a stability of the modulation index, such that at its frequency change of a duration T, there is an exactly corresponding phase change of $\pm \pi/2$.

In the case of a partial response frequency with 5 (five) states with a frequency index of ½, there is taken $k_1 = 1$, $k_2 = 2$, $k_3 = $ = amd $k_1 = 0$, if $i > 3$
from whence:
$$d_n = (\alpha_n + d_{n-2}) \text{ modulo } 2 \quad (6)$$
$$p_n = d_n + 2d_{n-1} + d_{n-2}$$

The values assumed by $P_n$, then, are 0, 1, 2, 3 and 4, which correspond to the signal $y_{5,n}(t)$ such that:

$$y_{5,n}(t) = A \cos 2\eta \left( f_o + \frac{\Delta F(p_n - 2)}{4} \right) t; t \in [nT, (n+1)T] \quad (7)$$

Figure 2:
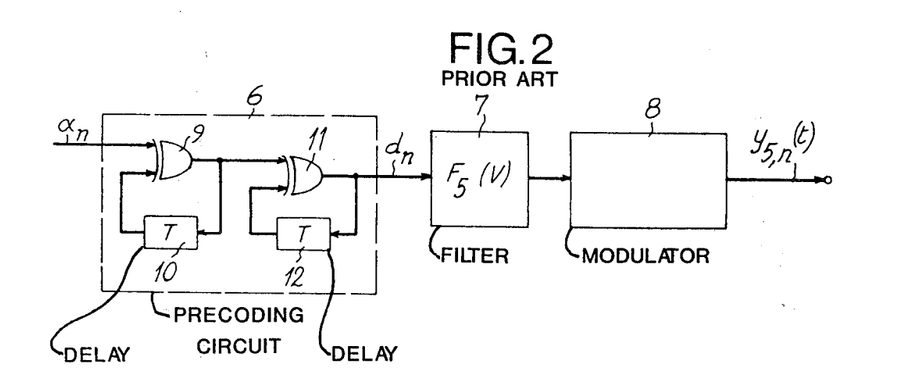
FIG. 2 is the diagram of a known "tamed FSK" modulation modulator (five states)

As a precedent, the modulation has a ½ index where $\Delta F = \frac{1}{2}T$. The known diagram of principle of a corresponding modulator is the one given in FIG. 2 which still comprises a precoding circuit 6, the input of which receives the pure binary signal $\alpha_n$ and the output of which is connected to the input of a filter 7. The output of filter 7 is connected to the input of a modulator 8, the index frequency of which is ½, which delivers $y_{5,5}(t)$. Precoding circuit 6 comprises a first exclusive OR gate 9, one input of which is connected to the input of precoding circuit 6 and the output of which is connected, for one part, to its second input through a delay-type circuit T 10 and, for the other, to the first input of a second exclusive OR gate 11. The output of the exclusive OR gate 11 is connected, for one part, to its second input through a delay-type circuit T 12 and, for the other part, to the output of circuit 6. Thus, precoding circuit 6 executes the above-indicated operation in formula (6). Filter 7 has a complex gain $F_5(\nu)$ such that:

$$F_5(\lambda) = 1 + 2\, e^{i\pi\nu T} + e^{\Delta i\pi\nu T} \qquad (8)$$

That filter corresponds to filter 2 in FIG. 1. The same remarks that were made with respect to modulator 3 may be made for modulator 8.

In order to reach the objectives of the present invention, and to avoid the drawbacks of the above-described modulators, modulators are used a simplified MSK modulation. That is why the principles of the simplified MSK modulation should now be reviewed.

The simplified MSK modulation is obtained by an attenuated lateral band filtering of a coherent modulation with two phase states. In this respect, it is possible to refer to the technical article titled "Etude Theorique et experimentale d'une modulation simplifiee a deplacement de frequence d'indice ½ a phase continue" (Theoretical and Experimental study of a simplified modulation with ½ frequency index displacement with continuous phase) by D. Pommier, J. Veillard and A. Glavieux which was published in the French journal "Les Annales des Télécommunications", 34—No. 7-8, 1979, pp. 423-437. It is also possible to refer to French Pat. No. 2 428 345, the first two named inventors of which are the authors of said French article.

For a rate of a flow to be transmitted equal to 1/T, in a channel of central frequency $f_c$, the modulation with two phase states must be performed on a carrier of frequency $F_1 = f_c - \frac{1}{4}T$ and the filter centered on frequency $f_2 = f_c + \frac{1}{4}T$ must have an impulse response of the form:

$$h_E(t) = \sin(2\pi f_2 t + 0) \text{ where } t\epsilon[0, T] \qquad (9)$$
$$h_E = 0 \text{ where } t[0, T]$$

Figure 3:
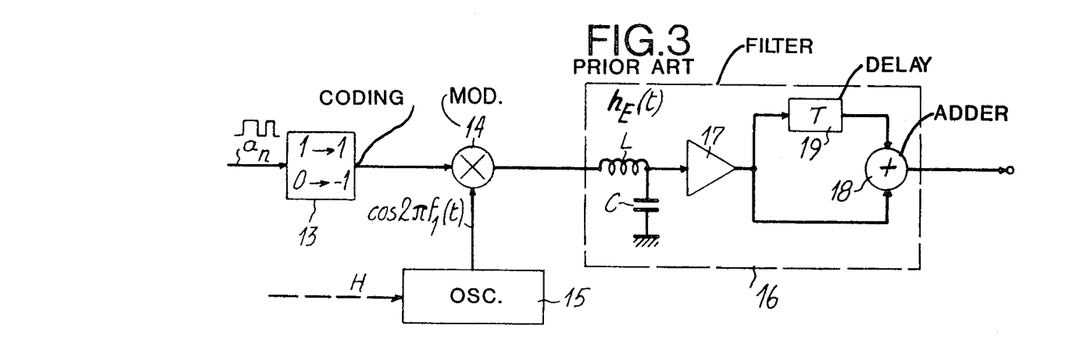
FIG. 3 is the diagram of a known simplified MSK modulation modulator.

FIG. 3 gives the known diagram of a modulator which delivers signals with MSK simplified modulation. The pure modulating binary signals are applied to the input of a coding circuit 13, the output of which is connected to an input of a ring-shaped modulator 14, the second input of which is connected to the output of an oscillator 15 which delivers carrier $f_1$. The output of ring-shaped modulator 14 is connected to the input of a filter 16, the output of which delivers the modulated signals. Filter 16 comprises an inductance L one terminal of which is connected to the input of the filter and the other terminal of which is connected to the input of an amplifier 17. The terminal which is common to the inductance L and to the input of amplifier 17 is connected to the ground by means of a capacitor C. The output of amplifier 17 is connected, for one part, directly to an input of an adding device 18 and, for the other part, through a delay-type circuit T 19, to the other input of the adding device 18. The output of adder 18 corresponds to that of filter 16.

Especially, an MSK modulation is obtained if, to the coherent two-phase modulation represented by:

$$V_1(t) = \sum_{n=-\infty}^{+\infty} a^*_n \cos 2\pi f_1 t\, R_1(t - nT) \qquad (10)$$

with
$R_1(t) = 1$ where $t\epsilon[0, T]$
$R_1(t) = 0$ where $t[0, T]$ there is associated an impulse response filter:

$$h_E(t) = \frac{1}{T} \sin 2\pi f_2 t;\ t\epsilon[0, T] \qquad (11)$$

with $$f_1 = \frac{n}{2T},\ f_2 = \frac{n+1}{2T} \text{ and } \sqrt{LC} = \frac{1}{2\pi f_2}$$

If n is large in front of the unit, that modulation is obtained even in the absence of phase coherence between $V_1(t)$ and $h_E(t)$, as shown in the article of the French journal indicated above.

The expression of the y(t) signal obtained at the output of circuit 18 of response $h_E(t)$ is written:

$$y(t) = A \sum_{k=-\infty}^{+\infty} a^*_{2k-1} R_2(t - 2kT) \cos \frac{\eta t}{2T} \cos(2\pi f_c t + \psi) + \qquad (12)$$
$$a^*_{2k} R_2(t - (2k+1)T) \sin \frac{\eta t}{2T} \sin(2\pi f_c t + \psi)$$

$R_2(t) = 1$ where $t\epsilon[-T, T]$
$R_2(t) = 0$ where $t[-T, T]$

It will be noted that in the simplified MSK modulation, the filtering takes place after the modulation, which is very advantageous in high frequency operations.

It is possible to obtain the 3 state modulation from a simplified MSK modulation since the expression (12) above can also be written:

$$y(t) = A \cos(2\pi f_c t + \varphi(t) + \psi)$$

with $$tg\varphi(t) = - \sum_{k=-\infty}^{+\infty} \left( \frac{a^*_k}{a^*_{k-1}}\, tg\, \frac{\eta t}{2T} \right) R_1(t - kT) \qquad (13)$$

as $$\frac{a^*_k}{a^*_{k-1}} = \pm 1,$$

using the continuity of the phase deduced from expression (12), we have:

$$\varphi(t) = \qquad (14)$$
$$- \sum_{k=-\infty}^{+\infty} \left( \frac{a^*_k}{a^*_{k-1}}\, \frac{\eta(t - kT)}{2T} - \varphi(kT) \right) R_1(t - kT)$$

$$\frac{\varphi(t)}{2} = \qquad (15)$$
$$- \sum_{k=-\infty}^{+\infty} \left( \frac{a^*_k}{a^*_{k-1}}\, \frac{\eta(t - kT)}{4T} - \frac{\varphi(kT)}{2} \right) R_1(t - kT)$$

-continued $$\frac{\varphi(t-T)}{2} = - \tag{16}$$

$$\sum_{k=-\infty}^{+\infty} \left( \frac{a^*_{k-1}}{a^*_{k-2}} \frac{\eta(t-kT)}{4T} - \frac{\varphi((k-1)T)}{2} \right) R_1(t-kT)$$

$$\phi_3(t) = \frac{\varphi(t)}{2} + \frac{\varphi(t-kT)}{2} \text{ and } d^*_n = -a^*_n a^*_{n-1}$$

$$\phi_3(t) = \tag{17}$$

$$\sum_{k=-\infty}^{+\infty} \left( \frac{d^*_k + d^*_{k-1}}{2} \frac{\eta(t-kT)}{2T} + \phi_3(kT) \right) R_1(t-kT)$$

That binary coding with signal corresponds to the one in Table I below.

TABLE I

| $a_k$ | $d_{k-1}$ | $d_k$ | $d^*_{k-1}$ | $d^*_k$ | $\frac{d^*_k + d^*_{k-1}}{2}$ | Phase shift in the interval [kT, (k + 1)T] | emitted frequency |
|---|---|---|---|---|---|---|---|
| 0 | 0 | 0 | −1 | −1 | −1 | −/2 | $f_c - \frac{1}{4}T$ |
|  | 1 | 1 | 1 | 1 | 1 | /2 | $f_c + \frac{1}{4}T$ |
| 1 | 1 | 0 | 1 | −1 | 0 | 0 | $f_c$ |
|  | 0 | 1 | −1 | 1 | 0 | 0 | $f_c$ |

It is possible to see that:

$$\frac{d^*_n - d^*_{n-1}}{2} = (d_n - d_{n-1}) - 1 = p_n - 1$$

Therefore there is found again, for signals $d^*_n$, the expression (3), that is to say the partial response modulation with 3 state frequency for which the phase continuity, is assured at each transition.

In the modulator in FIG. 4, the pure binary signals $a_n$ are applied to the input of a precoding circuit 20, the output of which is connected to the input of a transition-type coding circuit 21, the output of which is connected to the input of a simplified MSK modulator 22 the output of which is connected to the input of a divider by two 23. The output of the divider by two 23 is connected, for one part directly, to the first input of a multiplier 24 and, for the other part, through a delay-type circuit 25, to the second input of multiplier device 24. The output of multiplier device 24 is connected to the input of a band filter 26.

Precoding circuit 20 is identical to the precoding circuit 1 in FIG. 1. That is why the components of circuit 20 have the same numerical references as the components of circuit 1. Transition-type coding circuit 21 also comprises an exclusive OR gate 27, the output of which is connected, through a delay-type circuit 28, to one of its inputs. The simplified MSK modulator 22 is identical with the one in FIG. 3. That is why the same numerical references are used to designate the circuits which compose it.

Circuit 20 transforms the $a_n$ signals into $d_n$ signals. Circuit 21 transforms the $d_n$ signals into $a_n$ signals. In modulator 22, circuit 13 transforms the binary signals (0,1) $a_n$ into $(-1,1)a^*_n$ signals. The divider by two 23 performs the operation in agreement with the expression (15) above. The delay-type circuit 25 performs the operation of expression (16) above and multiplier 24 performs the addition of the phases of its input signals to obtain a signal in agreement with expression (17). Multiplier 24 may be a conventional ring-shaped modulator.

Band filter 26 is centered on the central frequency $f_c=(f_1+f_2)/2$. Its effect is to eliminate harmonics. Filter 26 must have a passing band which is wide enough to transmit the modulated signal without any distortion. In one embodiment, it was a Butterworth filter, with three terminals and a 3 dB band width of 2.5 MHz for a rate of flow of 2 Mbits/s. Its sole purpose is to eliminate the parasitic responses outside the band.

Going back to the expression of the phase $\varphi(t)$ at the output of the MSK modulator, and if $$\frac{\varphi(t)}{4} \quad \frac{\varphi(t-T)}{2} \text{ and } \frac{\varphi(t-2T)}{4},$$

are calculated in succession there is obtained, after summation:

$$\tag{18}$$

$$\phi_5(t) = \frac{\varphi(t)}{4} + \frac{\varphi(t-T)}{2} + \frac{\varphi(t-2T)}{4}$$

and if one writes:
$$d^*_n = -a^*_n a^*_{n-1}$$
there is obtained:

$$\phi_5(t) = \sum_{k=-\infty}^{+\infty} \left[ (\tfrac{1}{4}d^*_k + \tfrac{1}{2}d^*_{k-1} + \tfrac{1}{4}d^*_{k-2}) \frac{\eta(t-kT)}{2T} + \phi(kT) \right] R_1(t-kT)$$

which is the expression of a 5 state frequency modulation with a ½ index and a continuous phase.

That binary coding with the signal corresponds to that of Table II below.

TABLE II

| $a_k$ | $d_{k-2}$ | $d_{k-1}$ | $d_k$ | $(\tfrac{1}{4}d^*_{k-2} + \tfrac{1}{2}d^*_{k-1} + \tfrac{1}{4}d^*_k)$ | phase shift | emitted frequency |
|---|---|---|---|---|---|---|
| 0 | 1 | 1 | 1 | 1 | η/2 | $f_c + \frac{1}{4}T$ |
|  | 0 | 0 | 0 | −1 | −η/2 | $f_c - \frac{1}{4}T$ |
|  | 1 | 0 | 1 | 0 | 0 | $f_c$ |
|  | 0 | 1 | 0 | 0 | 0 | $f_c$ |
| 1 | 1 | 0 | 0 | −½ | −η/4 | $f_c - \frac{1}{8}T$ |
|  | 0 | 0 | 1 | −½ | −η/4 | $f_c - \frac{1}{8}T$ |
|  | 1 | 1 | 0 | ½ | η/4 | $f_c + \frac{1}{8}T$ |
|  | 0 | 1 | 1 | ½ | η/4 | $f_c + \frac{1}{8}T$ |

It can be seen that:

$$\tfrac{1}{4}d^*_{k-2} + \tfrac{1}{2}d^*_{k-1} + \tfrac{1}{4}d^*_k =$$

$$\frac{(d_{k-2} + 2d_{k-1} + d_k) - 2}{2} = \frac{p_n - 2}{2}$$

Therefore, there is found again the partial response modulation with 5 frequency states for which the phase continuity is assured at each transition.

Figure 5:
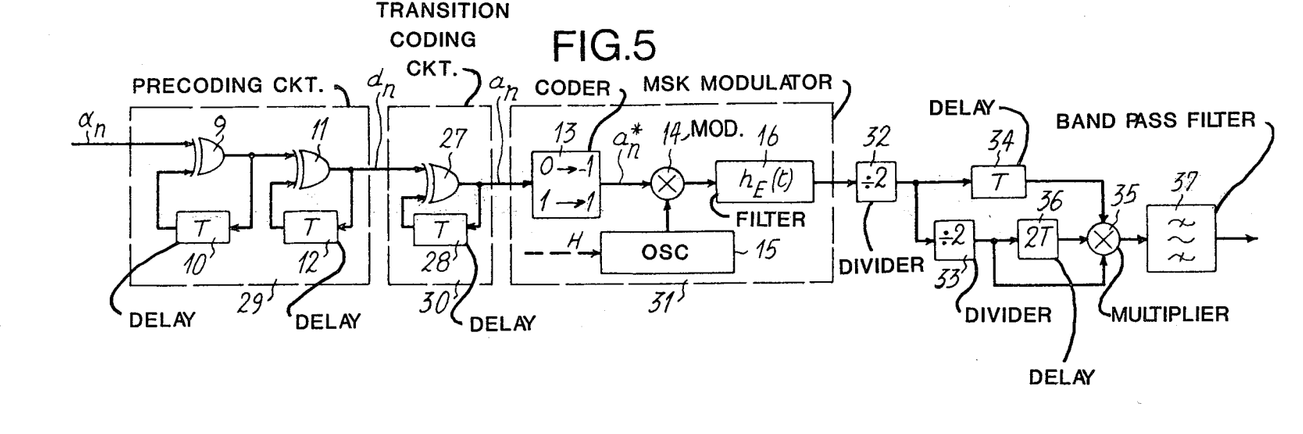
FIG. 5 is the diagram of a second tamed FSK modulator with five states, according to the present invention.

In the modulator in FIG. 5, the signals $a_n$ are applied to the input of a precoding circuit 29, the output of which is connected to the input of a transition-type coding circuit 30, the output of which is connected to the input of a simplified MSK modulator 31, the output of which is connected to the input of a divider by two 32. The output of divider by two 32 is connected for one part to the input of another divider by two 33 and, for the other part, through a delay-type circuit T 34, to the first input of a multiplier 35. The output of divider by two 33 is connected, for one part directly to the second input of multiplier 35 and, for the other part, through a delay-type circuit 2T 36, to the third input of multiplier 35. The output of multiplier 35 is connected to the input of a band filter 37 which delivers the modulated signal.

Precoding circuit 29 is identical with precoding circuit 6 in FIG. 2. Circuit 30 is identical with circuit 21 in FIG. 5. The simplified MSK modulator 31 is identical with that in FIG. 3, that is why the same numerical references are used to designate the circuits which compose it. Dividers by two 33 and 32 prepare the terms of the expression (18) above. Multiplier 35, which may be decomposed into two ring-shaped multipliers, performs the multiplications necessary to obtain the phase additions of expression (18). Band filter 37 is centered on the central frequency $f_c = (f_1 + f_2)/2$ and it has as its effect to eliminate harmonics.

Figure 6:
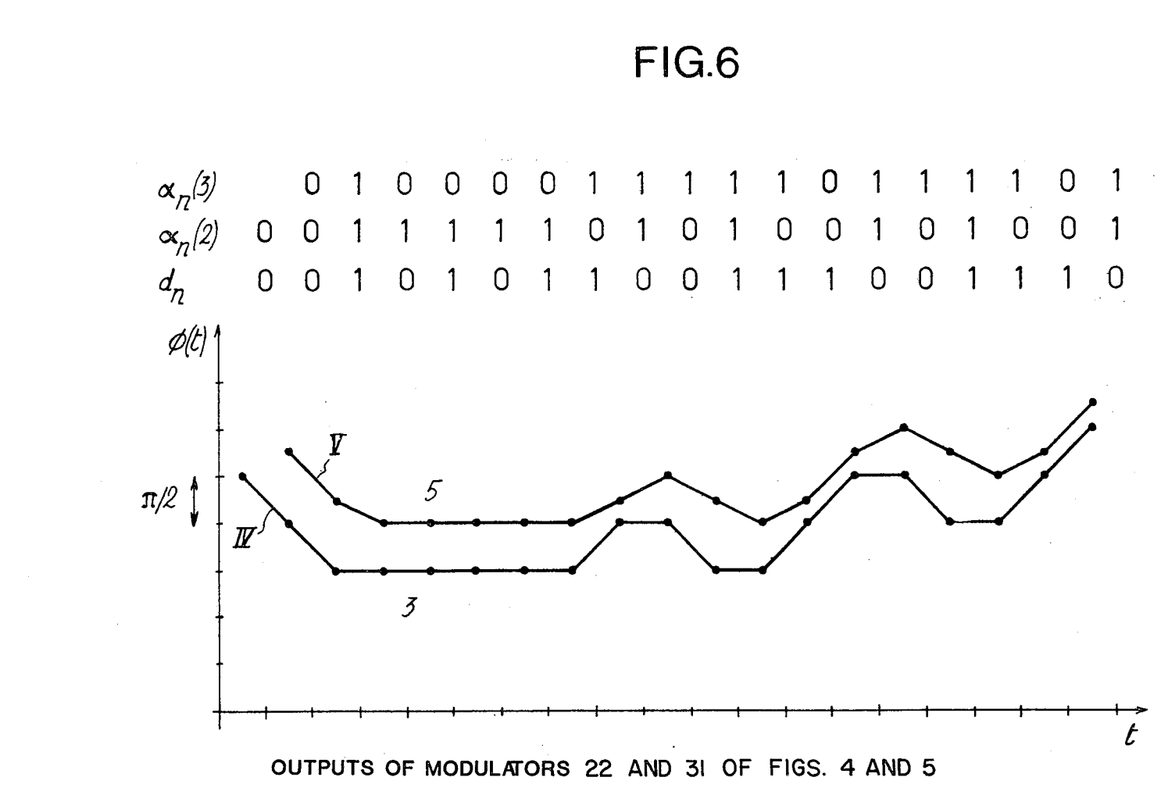
FIG. 6 is a diagram which illustrates the behavior of the modulation phases at the outputs of the modulators in FIGS. 4 and 5.
Figure 7:
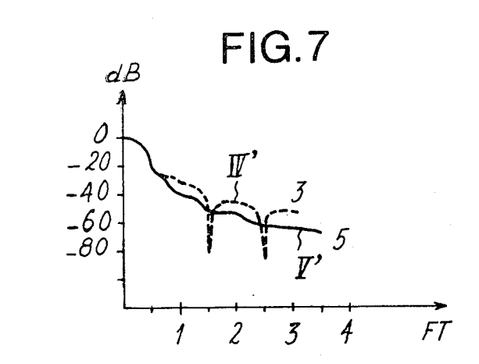
FIG. 7 is a diagram which illustrates the power spectrum densities of the modulation generated by the modulators in FIGS. 4 and 5.

For a given succession of $d_n$ symbols, FIG. 6 represents the variations of the phase of signals IV and V, respectively delivered by the modulators of FIGS. 4 and 5. The power spectrum densities corresponding to them are represented in FIG. 7 by curves IV' and V'. When observing the curves in FIGS. 6 and 7, it can be seen that the passage from 3 to 5 states does not lead to a very important reduction of the band.

In practice, in order to ensure a more rapid decreasing of the power spectrum density, it is necessary to ensure not only the phase continuity but also the continuity of its derivative, that is to say the continuity of the instantaneous frequency of the modulated signal. In order to obtain that result, it is suggested, according to the present invention, to shape the phase transitions, in other words, to smooth the phase transitions. The modulator in FIG. 8, in which the phase transitions have been smoothed, is deduced from the modulator in FIG. 4, through the insertion of a filter 38 at the output of the divider by two 23. Thus, the output of filter 38 is connected to multiplier 24 and to delay-type circuit 25. Filter 38 shapes the transitions. The impulse response of filter 38 is null if $t > T$, a condition which is sufficient to preserve the value of the phase emitted at instants $(k+\frac{1}{2})T$.

Figure 8:
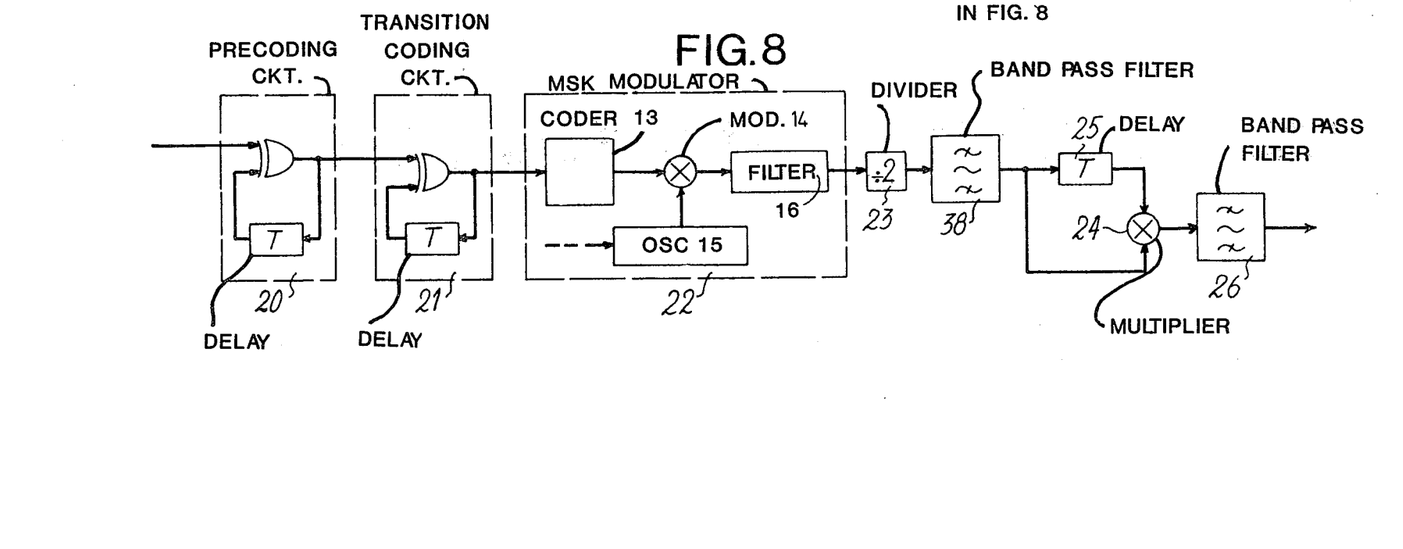
FIG. 8 is the diagram of a third modulator according to the present invention and which delivers a five states TFM modulation with continuous phase and frequency.
Figure 9:
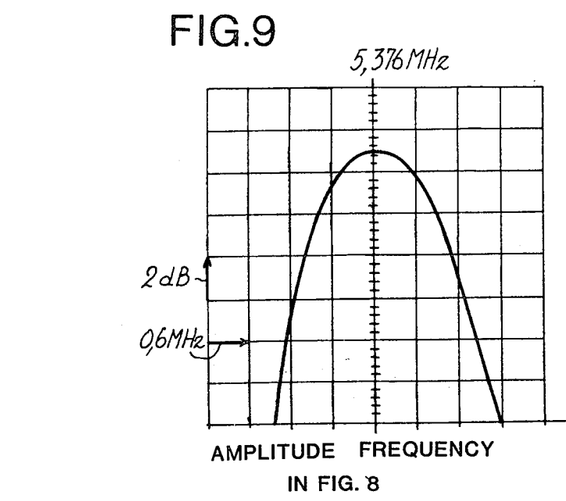
FIG. 9 is an example of the amplitude-frequency diagram of the shaping filter used in the modulator in FIG. 8.

In an embodiment which has served experimentally to assess the modulator in FIG. 8, filter 38 was practically a filter of the gaussian type, with a 3 dB band width of 1.5 MHz, for a transmission rate of 2.048 Mbits/s. FIG. 9 shows the amplitude-frequency response curve of such a filter. Its impulse response is formed of a sine-type arch, the support of which is close to 1.4 T.

Going back again to FIG. 10, to consider curve IV in FIG. 6, and if there are marked on that curve, beside the small circles corresponding to instants kT, crosses corresponding to instants $(k+\frac{1}{2})T$, it can be seen that it is possible, beside solid line curve IV, to trace a curve VIII which runs through all of the crosses, but which smoothes all of the angular 'elbows' of curve IV. In practice, curve VIII represents the phase variations at the output of the modulator in FIG. 8. In effect, filter 38 performs the smoothing of curve IV.

Figure 10:
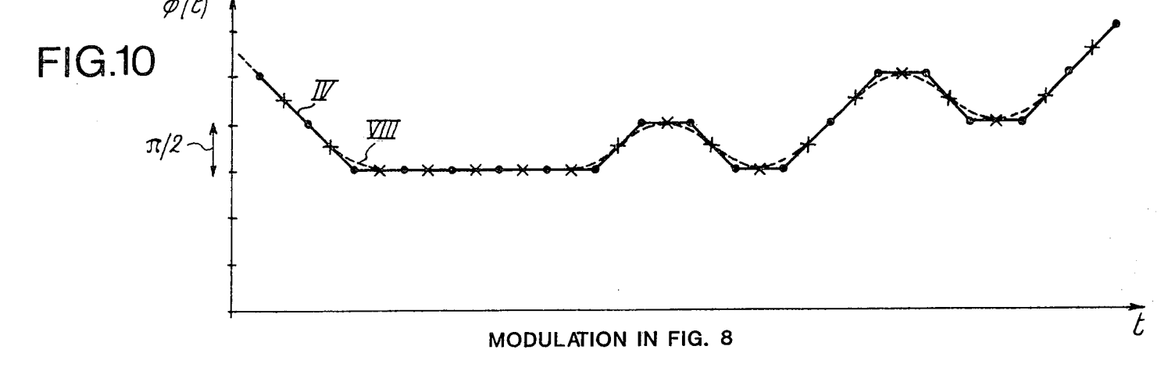
FIG. 10 is a diagram which illustrates the behavior of the modulation phase at the output of the modulator in FIG. 8.

It can be seen that the modulation obtained at the output of the modulator in FIG. 8, illustrated by curve VIII in FIG. 10, is a 5 state modulation. Indeed, the phase jumps emitted between times $(k+\frac{1}{2})T$ and $(k+1+\frac{1}{2})T$ correspond to the sum of the two half jumps:

$$\frac{d^*_k + d^*_{k-1}}{2} \frac{\eta}{2T} \frac{T}{2}$$

and $$\frac{d^*_{k+1} + d^*_k}{2} \frac{\eta}{2T} \frac{T}{2}$$

that is:

$$\left( \frac{d^*_{k+1}}{4} + \frac{d^*_k}{2} + \frac{d^*_{k-1}}{4} \right) \frac{\eta}{2}$$

The last expression effectively corresponds to the coding rule of the 5 state modulation, which has been defined above.

Figure 11:
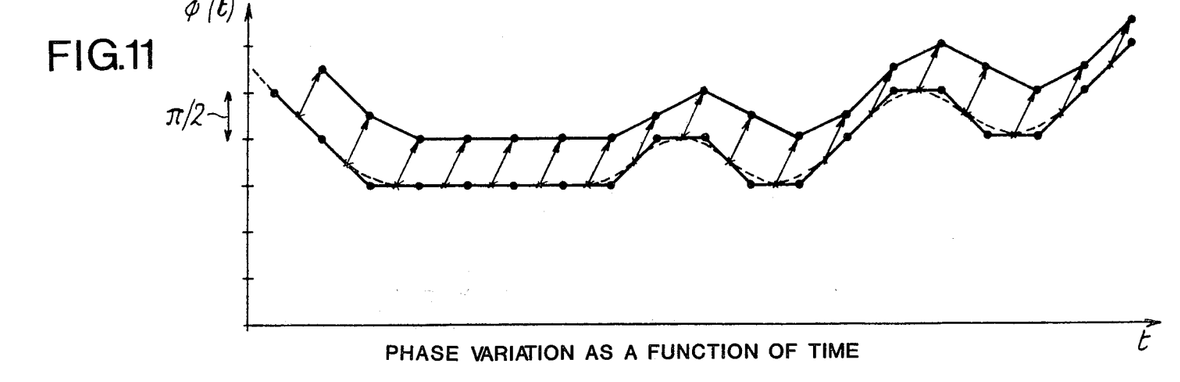
FIG. 11 represents three curves of phase variations as a function of time, those curves respectively corresponding to the FSK duo-binary, tamed FSK and TFM modulations and making it possible to see how one passes from one to the other.

It must be noted that, for a same $d_n$ succession, the phase at times $(k+1)T$ of the 5 state modulation is deduced directly from the phase at times $(k+\frac{1}{2})T$ of the three (3) state modulation. The shaping of the transitions by filter 38 not modifying those values, the structure of a demodulator designed for the 3 state modulation and making use of the sampling time $(k+\frac{1}{2})T$ will thus still be suitable, whatever may be the shape of the transitions, for the demodulation of the 5 state signals. That is illustrated in FIG. 11 in which the upper curve corresponds to a tamed FSK modulation (with 5 states), the lower solid line curve corresponds to a duo-binary FSK modulation and the dotted lower curve corresponds to the TFM modulation, those curves obviously corresponding to the same train of binary elements. The arrows indicate how it is possible to pass from the lower curves to the upper curve.

I claim:

1. A process for generating a duo-binary FSK modulation comprising the steps of: first applying to a modulating binary signal train a 3- state partial response precoding, second applying to the precoded signal a coding by transition, third applying to the resulting transition coded signal a simplified MSK modulation at the carrier frequency, fourth dividing by two the modulated signal of the first step, and fifth applying to the modulated signal divided by two, a multiplication by the same modulated signal with a divided frequency delayed by one period of binary element.

2. A process for generating a "tamed FSK" modulation, comprising the steps of: first applying to a modulating binary signal train a 3-state partial response precoding, second applying to the precoded signal a transition-type coding, third applying to the resulting transition coded signal a simplified MSK modulation at the carrier frequency, fourth dividing by two the signal modulated in the third step and fifth applying to the modulated signal divided by two a multiplication by the modulated signal with a frequency divided by two and delayed for one part by one period of a binary element and, for the other part, by two periods of said binary elements.

3. The process for generating a TFM modoulation, using the duo-binary FSK generating process according to claim 1, and the further step of wave shaping and filtering signals between the fourth division by two step and the fifth multiplication step.

4. A modulator which utilizes the process according to claim 1, said modulating comprising precoding circuit means, a transition-type coding circuit means, MSK modulator means, divide by two means, multiplier means, and delay-type circuit means, in which the modulating binary signal train is applied with partial response to said precoding circuit means, an output of which is connected to said transition-type coding circuit means, applying an output of said transition-type coding circuit means to the input of said simplified MSK modulator means, an output of said MSK modulator means being connected to the input of said means for dividing the frequency by two, an output of said divide by two means being connected for one part directly to the input of said multiplier means and, for the other part, to the other input of said multiplier means via said delay-type circuit means, in which the delay is equal to the period of the train of binary elements.

5. The modulator according to claim 4, to obtain a TFM modulation, and a wave shaping filter means, in which an output of said means for dividing by two is connected to the input of said wave shaping filter means the output of said wave shaping filter means being connected, for one part to an input of said multiplier and for the other part to the input of said delay-type circuit means.

6. The modulator according to claim 5, characterized in that the wave shaping filter means has a null impulse response when a delay time of a signal from said divider means by two is greater than the delay time of said delay-type circuit means.

7. A modulator according to claim 5, characterized in that said wave shaping filter means is a gaussian filter with three terminals and with a 3 dB band width equal to 0.7/T.

* * * * *